(12) United States Patent  (10) Patent No.: US 7,549,606 B2
Quan  (45) Date of Patent: Jun. 23, 2009

(54) LAVATORY FAST PACK SYSTEM AND METHOD

(75) Inventor: William C. Quan, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/465,937

(22) Filed: Aug. 21, 2006

(65) Prior Publication Data

US 2006/0289698 A1  Dec. 28, 2006

Related U.S. Application Data

(62) Division of application No. 10/825,906, filed on Apr. 15, 2004, now Pat. No. 7,100,872.

(51) Int. Cl.
 *B64D 11/02* (2006.01)
(52) U.S. Cl. ........................................ 244/118.5; 4/663
(58) Field of Classification Search ............. 244/118.5, 244/129.4; 186/40; 4/663, 664, 254, 628–630, 4/548, 549
 See application file for complete search history.

(56) References Cited

U.S. PATENT DOCUMENTS

| | | | | |
|---|---|---|---|---|
| 1,798,183 A | * | 3/1931 | Voshardt | .......................... 4/630 |
| 2,808,306 A | * | 10/1957 | Schilling | .................... 312/207 |
| 3,570,503 A | | 3/1971 | DeBoliac | |
| 4,396,240 A | * | 8/1983 | Henson | ....................... 312/237 |
| RE32,175 E | | 6/1986 | Piech et al. | |
| 4,884,767 A | * | 12/1989 | Shibata | .................... 244/118.5 |
| 5,073,997 A | * | 12/1991 | Rabe | ............................. 4/629 |
| 5,150,863 A | * | 9/1992 | Hozumi | .................... 244/118.5 |
| 5,205,628 A | * | 4/1993 | Swets et al. | ................. 312/216 |
| 5,655,734 A | | 8/1997 | Dahl | |
| 5,984,440 A | * | 11/1999 | Watson | ....................... 312/206 |
| 6,007,025 A | | 12/1999 | Coughren et al. | |
| 6,079,669 A | | 6/2000 | Hanay et al. | |
| 6,101,766 A | | 8/2000 | Mogensen | |
| 6,343,845 B1 | * | 2/2002 | Woodard | .................... 312/248 |
| 6,443,393 B1 | | 9/2002 | Ooi et al. | |
| 6,547,183 B2 | | 4/2003 | Farnsworth | |
| 6,644,441 B1 | | 11/2003 | Ebrahimi | |
| 6,857,493 B2 | * | 2/2005 | Shupp et al. | ................ 180/168 |

FOREIGN PATENT DOCUMENTS

JP  02220409  8/1990
JP  03350235  12/1991

* cited by examiner

*Primary Examiner*—Tien Dinh
(74) *Attorney, Agent, or Firm*—Lee & Hayes, PLLC

(57) ABSTRACT

Apparatus and methods for cabinet devices for lavatories are provided. In one embodiment, a method for resupplying a lavatory in an aircraft includes removing a first amenities module from an amenities cabinet in the lavatory; and inserting a second amenities module into the amenities cabinet, wherein the first and second amenities modules include a plurality of amenity compartments. In another embodiment, a method of providing a lavatory unit includes providing a cabinet assembly including a first wall having an opening disposed therethrough and a second wall having at least one access port; inserting a module into the cabinet assembly through the opening in the first wall, the module having at least one compartment disposed therein; and aligning the at least one compartment with the at least one access port.

10 Claims, 5 Drawing Sheets

US 7,549,606 B2

LAVATORY FAST PACK SYSTEM AND METHOD

CROSS REFERENCE TO RELATED APPLICATIONS

This patent application is a divisional application of, commonly-owned U.S. patent application Ser. No. 10/825,906 entitled "Lavatory Fast Pack System and Method" filed on Apr. 15, 2004, which application is incorporated herein by reference.

FIELD OF THE INVENTION

This invention relates to lavatories and, more specifically, to aircraft lavatories having modular components.

BACKGROUND OF THE INVENTION

Turnaround time for cleaning and other maintenance on an aircraft between flights has a direct effect on operation cost of the aircraft. More specifically, lavatory maintenance between flights must be fast in order to minimize the amount of time and aircraft transitions from off-loading passengers and on-loading passengers. Maintenance personnel must manually check and replace all the necessary items within the lavatory, thus expending valuable turnaround time.

For example, Japanese Patent Application 02220409 to Hiroyuki discloses a lavatory that includes an external door that allows maintenance personnel to access a trash compartment and an amenities cabinet within the lavatory. This improves the efficiency of turnaround by allowing maintenance personnel to replace amenities items and dispose of trash from outside the lavatory. However, the maintenance personnel must still manually touch each item going into and out of the lavatory, thereby wasting valuable turnaround time.

Therefore, it would be desirable to further reduce aircraft service turnaround time particularly with regards to replenishment of lavatories.

SUMMARY

The present invention is directed to apparatus and methods that provide a more efficient maintenance turnaround by ground crew when replenishing lavatory necessities. In one embodiment, a method for resupplying a lavatory in an aircraft includes removing a first amenities module from an amenities cabinet in the lavatory; and inserting a second amenities module into the amenities cabinet, wherein the first and second amenities modules include a plurality of amenity compartments.

In another embodiment, a method of providing a lavatory unit within a structure includes providing a cabinet assembly including a first wall having an opening disposed therethrough and a second wall having at least one access port; inserting a module into the cabinet assembly through the opening in the first wall, the module having at least one compartment disposed therein; and aligning the at least one compartment with the at least one access port.

BRIEF DESCRIPTION OF THE DRAWINGS

Embodiments of the present invention are described in detail below with reference to the following drawings.

DETAILED DESCRIPTION

The present invention relates to apparatus and methods for providing more efficient use of lavatory space. Many specific details of certain embodiments of the invention are set forth in the following description and in FIGS. 1-6 to provide a thorough understanding of such embodiments. One skilled in the art, however, will understand that the present invention may have additional embodiments, or that the present invention may be practiced without several of the details described in the following description.

Figure 1:
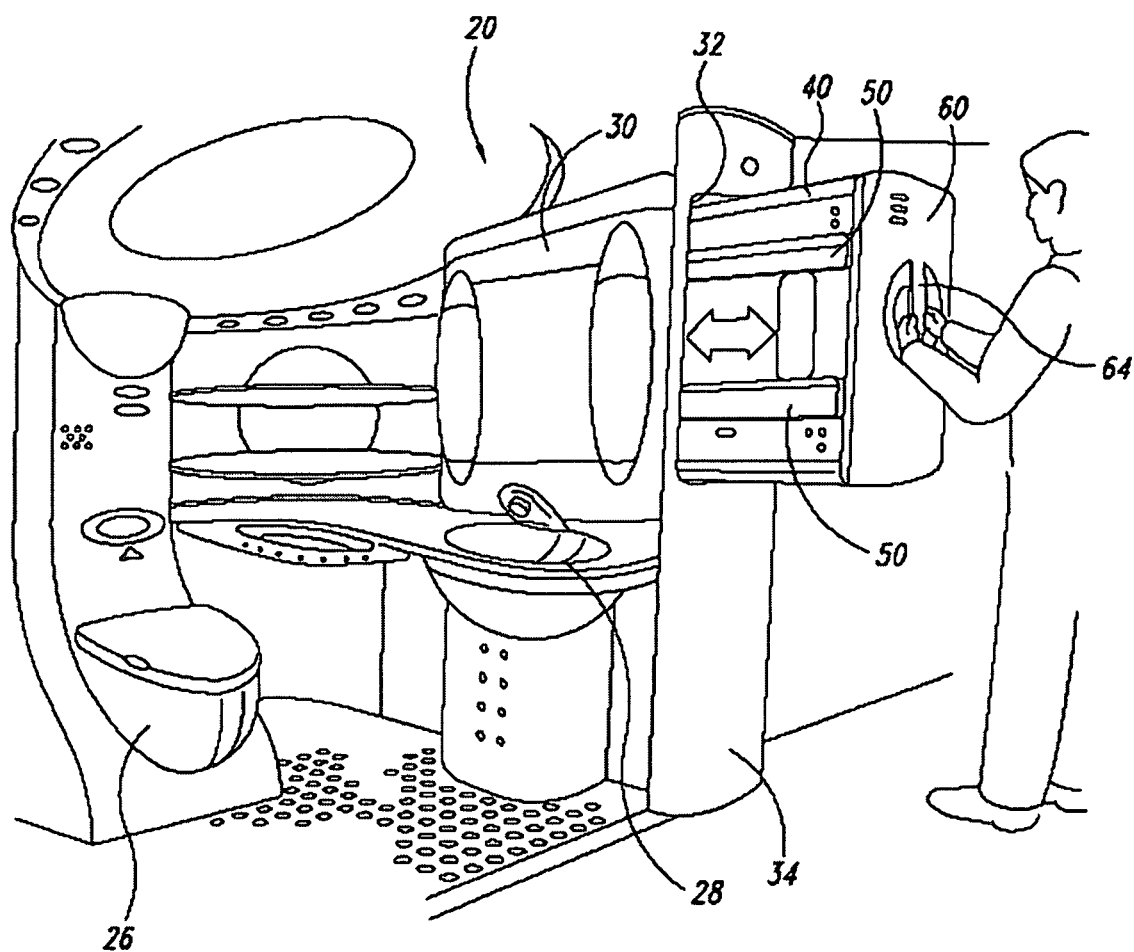
FIG. 1 is an isometric view of a lavatory unit in accordance with an embodiment of the present invention.

FIG. 1 illustrates a view of a lavatory unit 20 formed in accordance with an embodiment of the invention. This embodiment may be used in any aircraft, other vehicles (e.g., ships, buses, trains, subways, monorails, etc.), or as a stand-alone unit. The lavatory unit 20 may include a commode 26, and a sink 28. The lavatory unit 20 includes an amenities cabinet 30 having an opening 32 at an exterior wall 34 of the lavatory unit 20. The amenities cabinet 30 slideably receives an amenities module 40 through the opening 32.

In this embodiment, the amenities module 40 includes sliding brackets 50 or similar devices for allowing the amenities module 40 to be slideably received by corresponding tracks or rolling devices (not shown) within the amenities cabinet 30. The amenities module 40 includes an external panel 60 having a locking dial 64 that when turned into a locking position, locks the amenities module 40 within the amenities cabinet 30. The external panel 60 matches the exterior wall 34 and is flush with the exterior wall 34 when the amenities module 40 is fully received within the amenities cabinet 30.

In one particular embodiment, the amenities module 40 includes various compartments for storing amenities, such as without limitation tissues, paper towels, soaps, lotions, etc., that are accessible by users of the lavatory unit through access ports in the amenities cabinet 30. In operation, maintenance personnel may perform the necessary replenishment of the amenities within the lavatory unit 20 by simply removing a previous amenities module 40 and installing a new amenities module 30 within the amenities cabinet 30.

Figure 2:
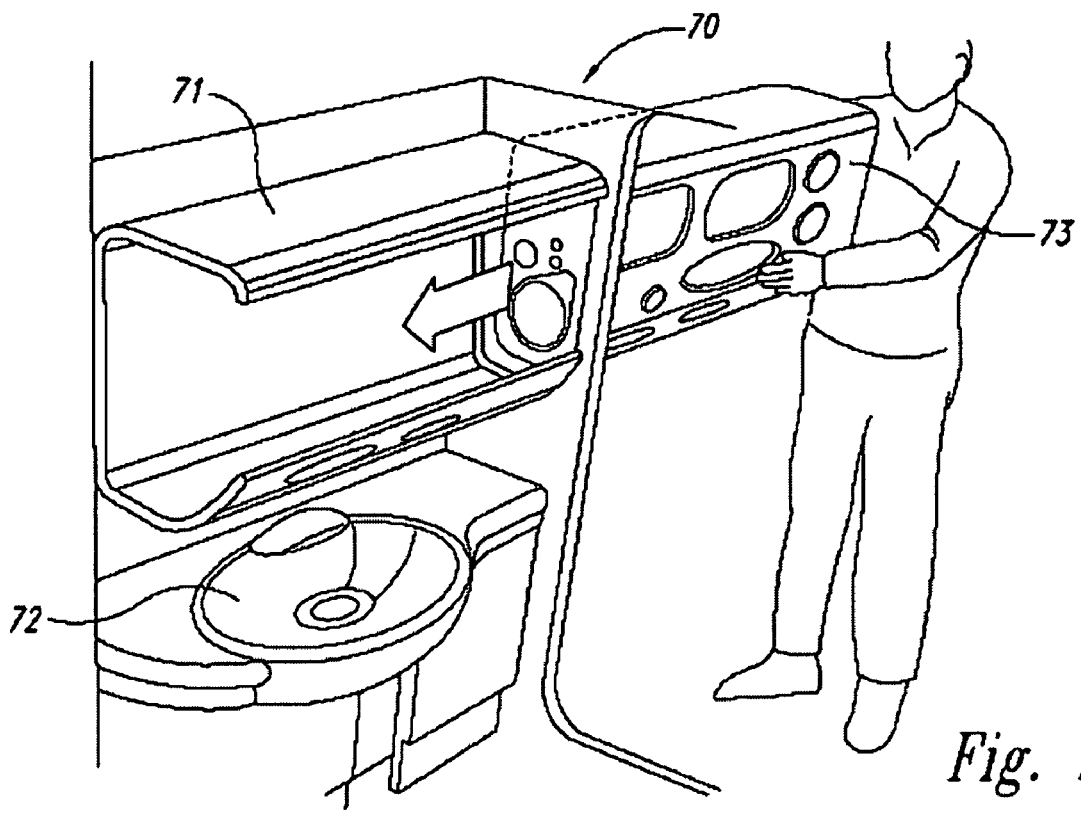
FIGS. 2 and 3 illustrate an alternate embodiment of the present invention.
Figure 3:
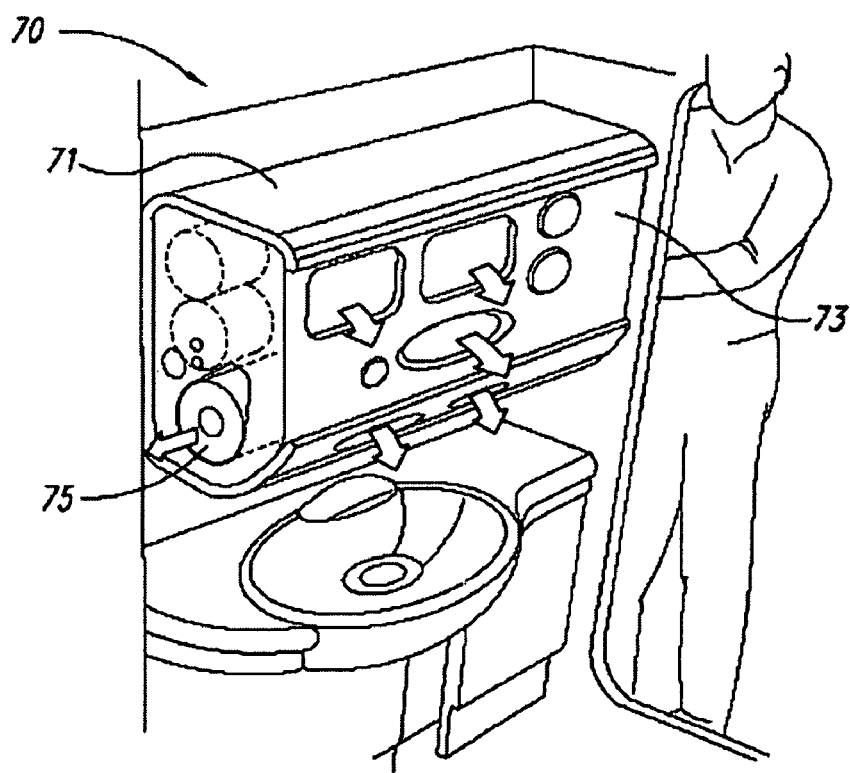

FIGS. 2 and 3 illustrate an alternate embodiment of an amenities cabinet system 70. The amenities cabinet system 70 includes a bracket 71 that is affixed to a bulkhead of a lavatory above a sink 72. The cabinet system 70 also includes a removable module 73 that is slideably received by the bracket 71. In one embodiment, the bracket 71 is C-shaped having an opening that faces a user of the sink 72. A base section of the bracket 71 includes access holes to allow a user access to amenities that are included within the module 73. The bracket 71 includes mechanism for allowing the module 73 to lock into place. The module 73 includes access openings that are exposed at the opening of the bracket 71. The access openings may include access to various items stored within the module 73, such as toilet seat covers, tissues, lotions, soap, paper towels, etc. At a cross-sectional end of the bracket 71, a side of the module 73 is exposed. At the exposed side of the module 73, the module may include an access port that provides access to spare toilet paper rolls. As one toilet paper roll is removed from the side of the module 73, another toilet paper roll stored within the module 73 falls into place at that opening.

Embodiments of apparatus and methods in accordance with the present invention may provide significant advantages over prior art lavatory units. For example, the lavatory unit in accordance with the present invention may reduce turnaround time for performing necessary maintenance on the lavatories between flights. More specifically, since there is no need for the maintenance personnel to restock the amenities within the lavatory by hand during the maintenance interval between flights, the time required to perform the necessary maintenance is reduced.

Figure 4:
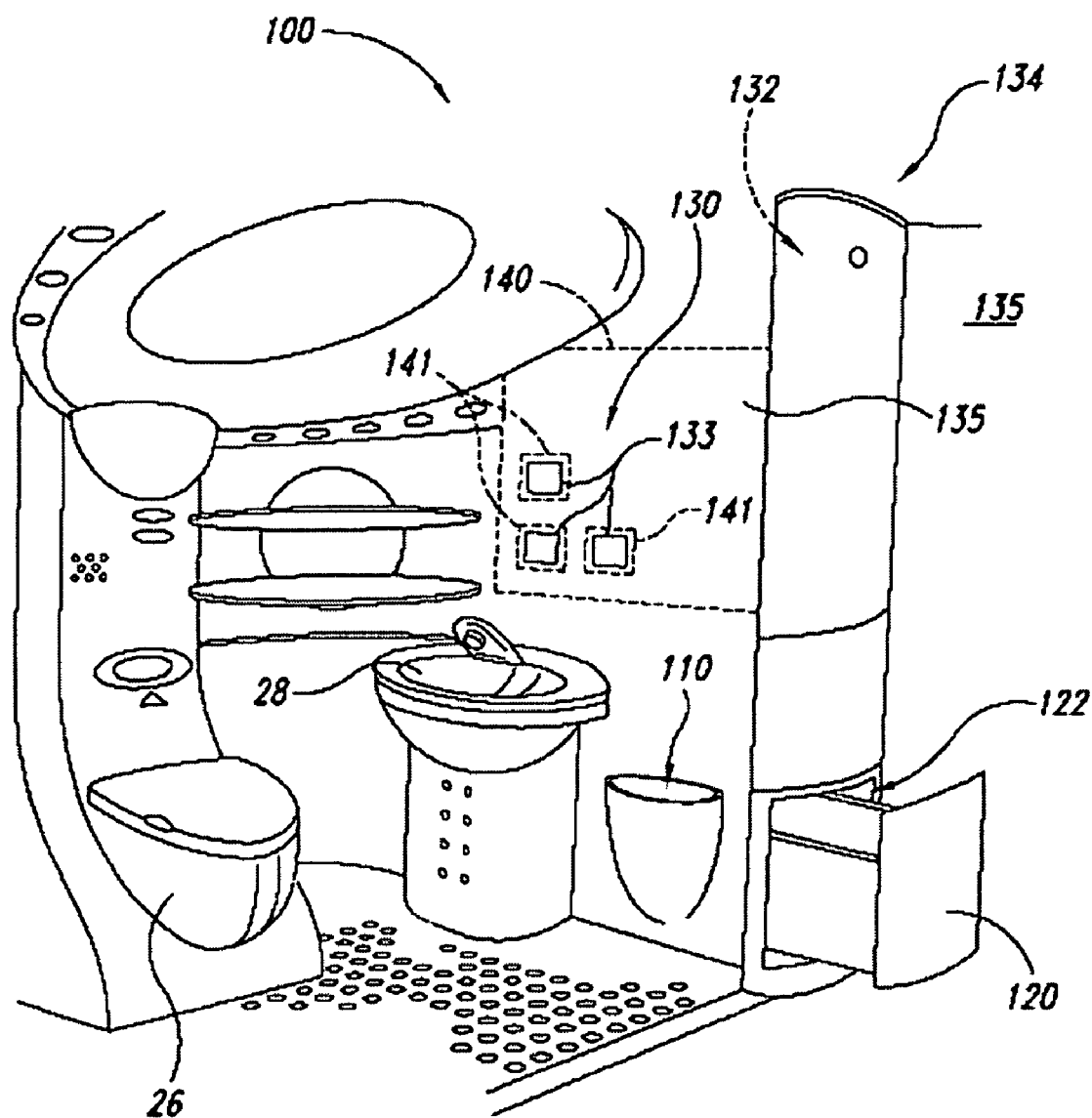
FIG. 4 is an isometric view of an alternate embodiment of the present invention.

It will be appreciated that a wide variety of lavatory units may be conceived in accordance with the present invention, and that the invention is not limited to the particular embodiments described above and shown in FIGS. 1-3. For example, FIG. 4 is an isometric view of a lavatory unit 100 in accordance with an alternate embodiment of the invention. In this embodiment, the lavatory unit 100 has many of the same components as the embodiment described above with reference to FIG. 1. For the sake of brevity, only significant differences will be discussed in detail.

As shown in FIG. 4, the lavatory unit 100 includes an amenities cabinet 130 having an first opening 132 disposed in a first wall 134 leading into a passenger cabin 135 of an aircraft. A plurality of access ports 133 are disposed in a second wall 135 of the amenities cabinet 120. As described above, a first module 140 (FIG. 1) is slideably received into the first opening 132. In FIG. 4, the first module 140 is shown in a closed or installed position. The first module 140 includes a plurality of compartments 141 disposed therein that are aligned with the access ports 133 in the second wall 135.

As further shown in FIG. 4, the lavatory unit 100 also includes a trash receptacle 110 formed in the first wall 134. A second module 120 (shown in an open or uninstalled position) is slideably received into a second opening 122 in the first wall 134, and is adapted to receive trash that an occupant of the lavatory unit 100 deposits into the trash receptacle 110.

In operation, when the first module 140 is positioned in the amenities cabinet 130, the compartments 141 containing various amenity items (e.g. tissues, paper towels, soaps, lotions, etc.) are aligned with the access ports 133, allowing an occupant of the lavatory unit 100 to access the amenities within the first module 140. As described above, the first module 140 might suitably be used to efficiently stock amenities within the amenities cabinet 130 in the manner described above. Also, the second module 120 may be used to receive trash discarded by aircraft passengers. Maintenance personnel may quickly and efficiently remove the trash from the lavatory unit 100 by removing the second module 120 and replacing it with an empty module. For both the restocking and trash removal tasks, the maintenance personnel may perform these operations from the passenger cabin 135 without entering the lavatory unit 100. In this way, further improvements to the efficiency of the maintenance process may be achieved, and the turnaround time of the aircraft may be reduced.

Figure 5:
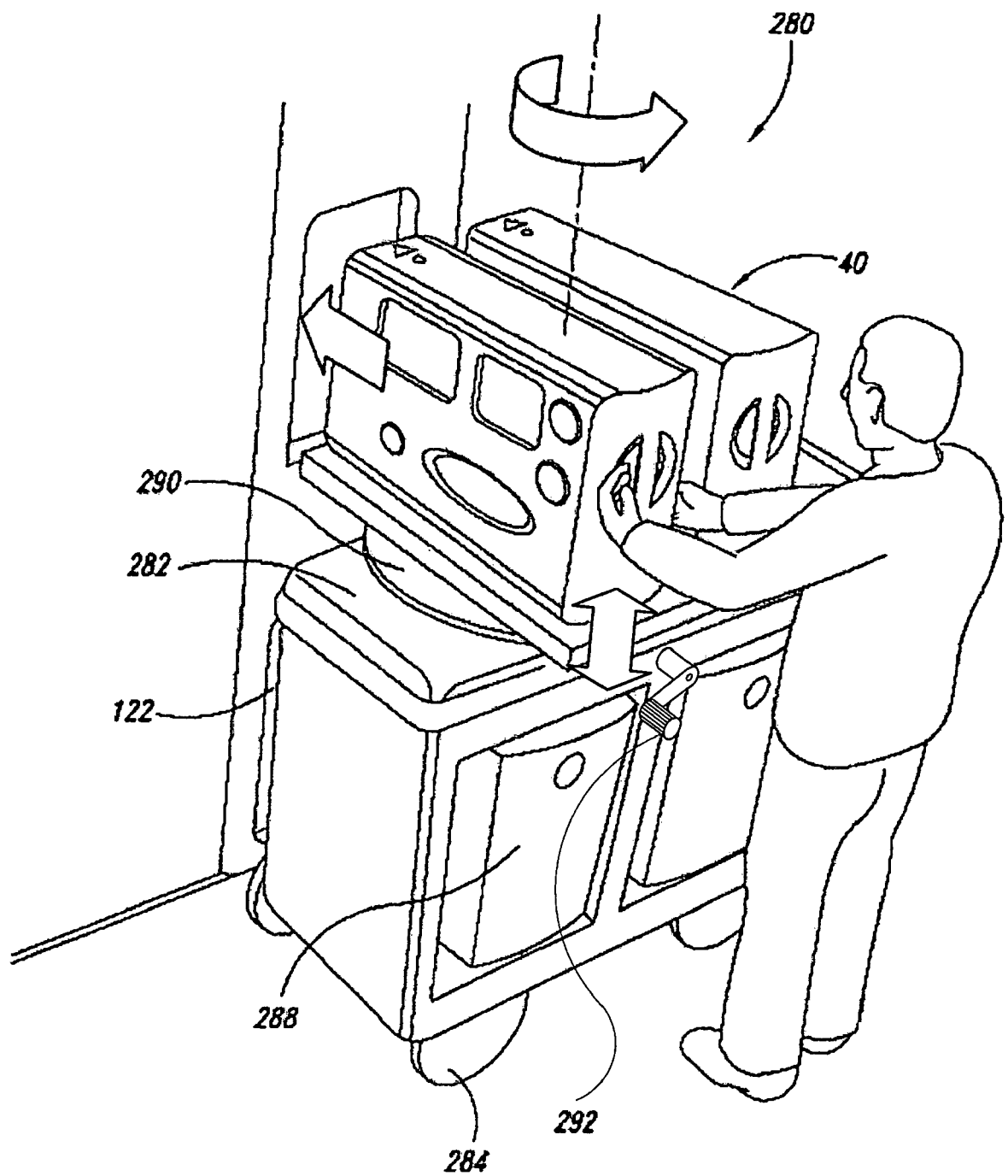
FIG. 5 is an isometric view of a cart used with an amenities module in accordance with an embodiment of the present invention.

FIG. 5 illustrates a view of an amenities module loading cart 280. The amenities module loading cart 280 includes a top surface 282 for supporting the amenities module 40. The amenities module loading cart 280 includes wheels 284 and is sized to allow aircraft personnel to wheel an amenities module 40 and a trash module 288 on the amenities module loading cart 280 into an aircraft and to a position adjacent to the exterior wall 34 of the lavatory unit 220. The amenities module loading cart 280 is sized vertically to allow aircraft personnel to slide a fully replenished amenities module 40 into the amenities cabinet 30 without having to lift or drop the amenities module 40 into the opening 32.

In an alternate embodiment, the amenities module loading cart 280 includes a height adjustment mechanism 292 for adjusting the height of the top surface 282, thereby allowing aircraft personnel to adjust the height of an amenities module 40 on the amenities module loading cart 280 to match the opening 32 of the amenities cabinet 30.

In still another embodiment, the top surface 82 is sized to support two amenities modules 40. Aircraft personnel may then remove a used module from the amenities cabinet 30 onto one side of the top surface 82, and then may move the amenities module loading cart 280 to allow a newly replenished module 40 that is on the other half of the top surface 282 into position to slide the new module 40 into the amenities cabinet 30.

The amenities module loading cart 280 includes a rotating tray 290. Two modules 40 are placed on the rotating tray 290 in a linear relationship to the cart 280 to allow the cart 280 to maneuver within the aisles of the aircraft. When the cart 280 is located at the proper position for allowing the removal and insertion of modules 288 and 40 into the lavatory, the rotating tray 290 is rotated 90° to allow a module 40 to be slideably removed from the amenities cabinet 30 and placed on the tray 290 and vice versa.

The trash module 288 is loaded onto a lower portion of the cart 280 at a height for allowing for it to be slideably received and removed from the second opening 122.

Figure 6:
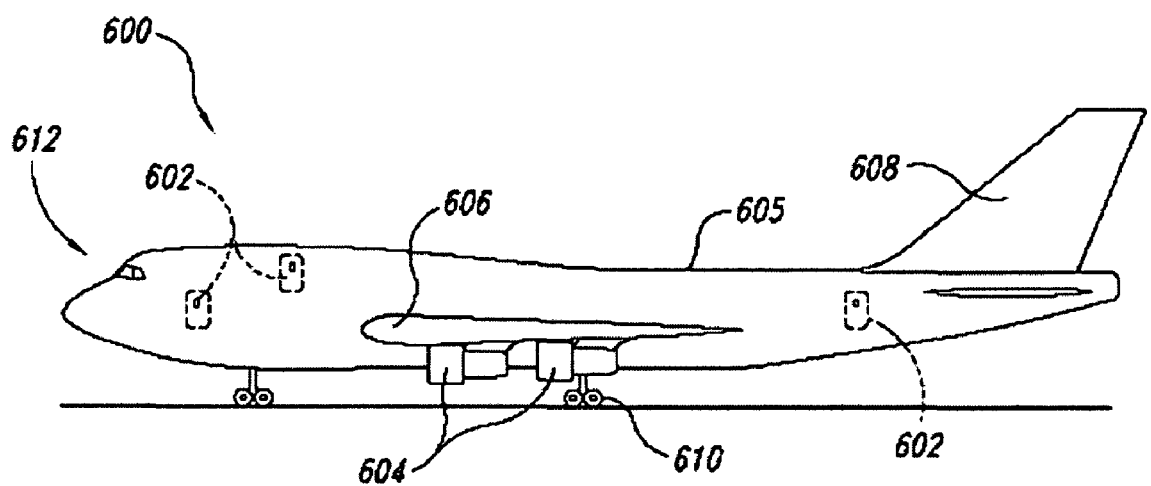
FIG. 6 is a side elevational view of an aircraft in accordance with another embodiment of the present invention.

A wide variety of apparatus may be conceived that include lavatory units in accordance with alternate embodiments of the present invention. For example, FIG. 6 is a side elevational view of an aircraft 600 having one or more lavatory units 602 formed in accordance with alternate embodiments of the present invention. In general, except for the lavatory units formed in accordance with the present invention, the various components and subsystems of the aircraft 600 may be of known construction and, for the sake of brevity, will not be described in detail herein. Embodiments of lavatory units 602 in accordance with the present invention, including but not limited to those embodiments described above and shown in FIGS. 1-5.

More specifically, as shown in FIG. 6, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. A plurality of lavatory units 602 formed in accordance with the present invention are located within the fuselage 605 and distributed throughout the various portions of the aircraft 600.

Although the aircraft 600 shown in FIG. 6 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in the other applications, including, for example, ships, buses, trains, recreational vehicles, subways, monorails, or any other desired application.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for resupplying a lavatory in an aircraft, the method comprising:
   stocking an amenities module configured to dispense consumable items, the amenities module having two or more amenity compartments where at least one amenity compartment is stocked with a different item than another amenity compartment, the amenities compartment having at least a first dispensing aperture and a second dispensing aperture, and wherein the amenities module is configured for engagement in an amenities cabinet;
   removing an existing amenities module from a first aperture in an amenities cabinet in the lavatory to the movable cart, the existing amenities module have a depleted stock of items; and
   inserting the stocked amenities module from the moveable cart into the first aperture in the amenities cabinet, wherein the first aperture is accessible from outside the lavatory,
   wherein the two or more amenity compartments are configured to be accessible through at least a second aperture and a third aperture in the amenities cabinet, the second aperture and the third aperture being accessible from inside the lavatory, and wherein the second aperture aligns with the first dispensing aperture and the third aperture aligns with the second dispensing aperture when the stocked amenities module is inserted into the amenities cabinet.

2. The method of claim 1, wherein removing the existing amenities module includes sliding the existing amenities module substantially horizontally from a first position in the amenities cabinet to a second position on the moveable earl such that the amenities module is supported during the removal by at least one of the amenities cabinet or the movable cart.

3. The method of claim 1, further comprising transporting the stocked amenities module into the aircraft using the movable cart.

4. The method of claim 1, wherein inserting the stocked amenities module into the amenities cabinet includes sliding the stocked amenities module substantially horizontally from a first position on the moveable cart to a second position in the amenities cabinet such that the amenities module is supported during the insertion by at least one of the amenities cabinet or the movable cart.

5. The method of claim 1, wherein inserting the stocked amenities module into the first aperture in the amenities cabinet includes locking the stocked amenities module into place.

6. The method of claim 3, wherein transporting the stocked amenities module into the aircraft includes rotating the stocked amenities module with respect to the movable cart during transport to align the stocked amenities module with the first aperture in the amenities cabinet.

7. The method of claim 4, wherein inserting the stocked amenities module into the amenities cabinet includes adjusting a height adjustment on the movable cart to vertically align the first position and the second position.

8. The method of claim 1, wherein the plurality of amenity compartments are configured to store two or more of a soap dispenser, a lotion dispenser, a tissue dispenser, and a paper towel dispenser.

9. A method of providing a lavatory unit within a structure, comprising:
   providing a cabinet assembly including a first wall having an opening disposed therethrough and a second wall having at least a first aperture and a second aperture, wherein the first wall is exterior to the lavatory unit and the second wall is interior to the lavatory unit;
   removing an existing module from the cabinet assembly through the opening in the first wall, the existing module having a plurality of compartments disposed therein that are configured to dispense consumable items;
   inserting a stocked module into the cabinet assembly through the opening in the first wall, the stocked module having a plurality of compartments disposed therein that are configured to dispense consumable items, through at least a first dispensing aperture and a second dispensing aperture wherein at least two different items are stocked in different compartments of the plurality of compartments, the stocked module inserted into a location in the structure to enable consolidated access to consumable items proximate a lavatory sink to enable customer accessibility; and
   aligning the first aperture with the first dispensing aperture and the second aperture with the second dispensing aperture when the stocked module is inserted into the cabinet assembly.

10. The method of claim 9, wherein, the stocked amenities module including a plurality of compartments is configured to contain at least two different items selected from a soap dispenser, a lotion dispenser, a tissue dispenser, or a paper towel dispenser.

* * * * *